April 8, 1958     F. M. KINNEY     2,830,193
POWER TRANSMISSION
Filed April 14, 1955     2 Sheets-Sheet 2
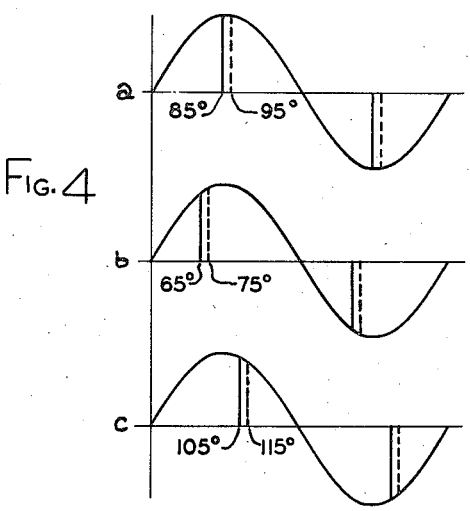
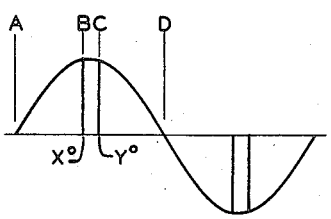
Fig. 2
INVENTOR.
FREDERICK M. KINNEY
BY
Clement J Paynoken
ATTORNEY

United States Patent Office 2,830,193
Patented Apr. 8, 1958

2,830,193

POWER TRANSMISSION

Frederick M. Kinney, St. Ann, Mo., assignor to Vickers Incorporated, Detroit, Mich., a corporation of Michigan Application April 14, 1955, Serial No. 501,358

10 Claims. (Cl. 290—7)

This invention relates to power transmission and more particularly to automatic speed control apparatus for alternating electric generator systems.

The invention is particularly useful in connection with automatic synchronizers for interconnecting alternating current circuits, for example an oncoming generator to another alternating current supply line under certain predetermined conditions relating to frequency and phase.

The area of the present invention includes not only speed control system as a whole, such as frequency (speed) responsive apparatus for matching the frequency of an oncoming generator to that of the line, but also important sub-combinations such as a system for selectively pulsing either one of two control elements, and a system for increasing the dwell time of a pulsed control element.

It is therefore an object of the present invention to provide new and useful apparatus for selectively pulsing an electrical control system in either one of two senses.

Another object of the present invention is to provide a new and useful apparatus for selectively pulsing either one of two control elements.

Another object of the present invention is to provide new and useful automatic control and regulatory apparatus for alternating current systems.

Still another object of the present invention is a new and improved system for automatically controlling the speed of a generator.

A further object of the present invention is an improved speed control for throttle controlled prime movers connected to generators.

Further objects and advantages of the present invention will be apparent from the following description, reference being had to the accompanying drawings wherein a preferred form of the present invention is clearly shown.

In the drawings:

Fig. 2 is a curve illustrating the derivation of the pulses applied to the inputs of the demodulator used in the apparatus of Fig. 1.

Fig. 3 is a chart with related curves showing demodulator output as related to the input pulses.

Fig. 4 is a series of curves illustrating pulse translation or shift by reactor control with an anticipation signal, and Fig. 5 is a chart with related curves showing progressive approach of the generator to synchronism with the line.

Figure 1:
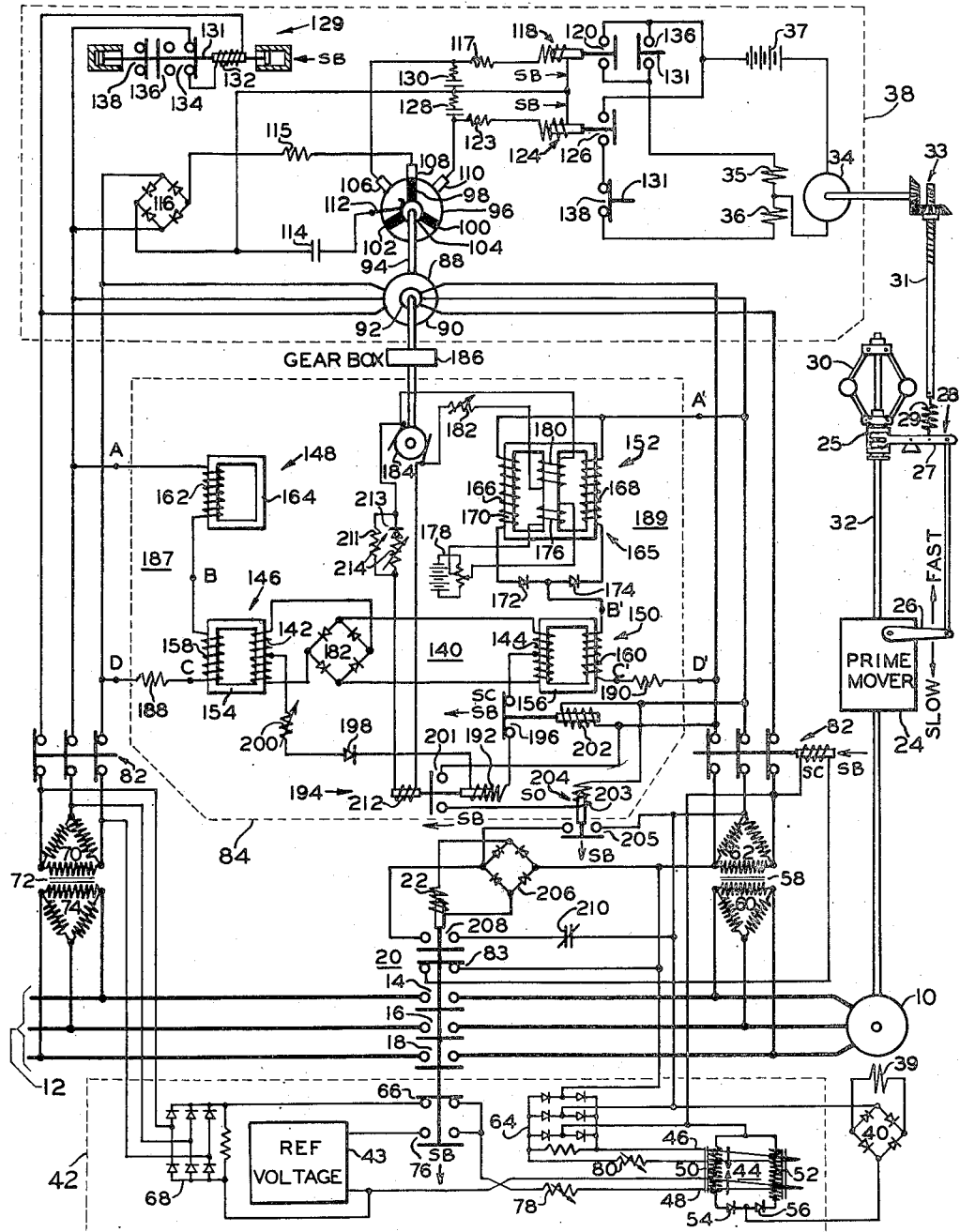
Fig. 1 is a diagram of a synchronizing apparatus with a speed matching unit embodying features of the invention.

The particular embodiment of the invention shown in Fig. 1 by way of example is in connection with an automatic synchronizer for paralleling two alternating current systems, an alternating current generator 10 with another alternating current supply source represented by the conductors 12 which are connected to a suitable source of supply and load not shown, for example another alternating current generator and a three-phase load. The actual interconnection between the two systems is made by a plurality of normally open switch contacts 14, 16 and 18 of a contactor 20 when the operating coil 22 of the contactor is energized in response to a predetermined set of conditions which include proper frequency and phase relations between the systems and generally, although not necessarily, after the terminal voltage of the oncoming machine has been matched to the voltage of line 12.

Motive power for the generator 10 is supplied by a prime mover with a speed control element, for example a diesel engine 24 with a throttle 26 supervised through a linkage 28 by a governor 30 coupled through a shaft 32 to the prime mover thereby to respond to the speed of the prime mover. The governor is recalibrated during the synchronizing operation by a reversible governor motor 34 which is a part of a speed matching unit 38 hereinafter described and which motor is provided with a split field having field sections 35 and 36 for selectively running the motor in one or the other directions depending on which field section is energized from a source of power such as a battery 37. The governor 30 works upon a pivoted lever 27 against the tension of a spring 29, which is adjustable by means of a screw 31, the latter being operated by means of the governor motor 34 through gearing 33.

As the speed of the prime mover increases, the rising floating collar 25, within which the bottom of the governor rotates, forces the left end of lever 27 upward and the throttle 26 downward, the reverse taking place when the prime mover speed decreases.

Excitation for the generator 10 is furnished by a field winding 39 that receives energy from the generator output through a rectifier 40 and a voltage regulator 42 which, before interconnection of the two systems, utilizes the line 12 as a reference to match the voltages of the two systems, and after interconnection of the systems regulates to a fixed reference voltage 43.

Before interconnection of the two systems, voltage regulation is effected by differentially comparing the respective voltages of the line 12 and of the generator 10 in a self-saturating magnetic amplifier 44 which controls the energy supplied to the rectifier 40. As seen in the drawing the amplifier 44 includes a pair of control windings 46 and 48 and a pair of load windings 50 and 52 on a saturable magnetic core, the load windings being in series with one-way electrical valves 54 and 56 to provide self-saturation and by their reversed orientation to provide the well-known doubler connection for furnishing alternating current to the rectifier 40, the immediate load of the amplifier 44. The paralleled load windings are connected in series with rectifier 40 across one of the phases of the generator output through a transformer 58 whose primary 60 is connected to the generator output. The voltage of the generator 10 is sampled by supplying current to the control winding 46 from the secondary 62 of the transformer 58 through a rectifier 64. A reference voltage from the line 12 is supplied to the magnetic amplifier control coil 48 through normally closed switch contacts 66 and a rectifier 68 from the secondary 70 of a transformer 72 whose primary 74 is connected to the line 12. After the contactor operating coil 22 is energized, as hereinbefore described, the switch contacts 66 are opened and a set of normally open switch contacts 76 are closed to substitute the fixed reference 43 in place of the line reference obtained from the rectifier 68. Additional adjustments of the currents supplied to the coils 46 and 48 may be made with rheostats 78 and 80.

The voltage regulator 42 is adjusted to maintain the output voltage of the generator 10 at the normal operating value when the prime mover 24 is held by the governor 30 at the proper speed to provide the normal electrical speed or frequency to the system. Actually from a standing start a generator is brought up to normal running speed within the matter of a few seconds. In a particular example, as the output voltage of the generator 10 builds up from a standing start, a slow-to-operate contactor 82 coupled to the generator output through normally closed contacts 83 is adjusted to operate within five seconds after the generator voltage reaches a value near the normal operating voltage of the systems to be interconnected. When operated, the contactor 82 closes a plurality of normally open contacts between transformers 58 and 72 and the speed matching unit 38 and a phase detection unit 84.

As hereinbefore pointed out, during the synchronizing operation the governor 30 is recalibrated or regulated by the speed matcher 38, which is responsive not only to the frequency difference between the two systems (generator 10 and line 12) but also responds in either one of two senses depending upon which of the systems is higher in frequency.

Through a pulsing system, the governor motor 34 is coupled to and responds to the output of a frequency detector which detects the frequency difference between the respective systems (generator 10 and line 12), and the direction of deviation, that is, which of the systems is higher than the other in frequency.

The particular detector in the illustrated embodiment is a differential self-synchronous motor 88 whose stator 90 is connectible to the line 12 through the contactor 82 and the transformer 72, and whose rotor 92 is connectable to the generator 10 through the contactor 82 and the transformer 58. The characteristics of a self-synchronous differential motor connected to two systems in this manner are such that if the slip frequency between the two systems is zero the rotor of the motor will stand still. However, if the frequency of one of the systems is higher than that of the other, the rotor of the differential motor will rotate at a speed proportional to the slip frequency, and in one or the other direction, depending on which of the systems has the higher frequency. Thus, the speed and direction of the differential motor rotor is indicative of the frequency difference between the two systems and also of which system has the higher frequency or electrical speed. For later explanatory purposes it is assumed that, as viewed in the drawing, rotor 92 rotates clockwise when generator 10 has the higher frequency. The output of the frequency detector is utilized to control the governor motor 34 thereby to regulate the speed of the prime mover 24 and to match the electrical speed of the generator 10 to that of the line 12.

The control of the governor motor is accomplished by selectively pulsing either one of its field sections 35 and 36, the pulsing being controlled by a commutator switching arrangement responsive to the differential motor.

Coupled to the shaft 94 of the motor rotor 92 is a commutator 96 having a plurality of conductive bars 98, 100, and 102, centrally connected by a slip ring 104, and insulatively spaced along the commutator periphery. Three brushes 106, 108 and 110, spaced along the periphery of the commutator are adapted to make selective contact with the commutator segments as the commutator is rotated. Contact with the slip ring 104 is made through a brush 112.

Being coupled to the differential motor 88 the rotational speed of the commutator is proportional to the frequency difference between the line 12 and the generator 10, and the direction of rotation depends on which of the two systems has the higher frequency. Whenever one of the commutator bars contacts the brush 108 a circuit is completed between an energy storage device, for example a condenser 114, and a rectifier 116 through a current limiting resistor 115, storing energy in the condenser. Such a position is shown in the drawing where commutator bar 98 is in contact with the brush 108. Thus, while the commutator is rotating, the condenser 114 is charged each time a bar contacts the brush 108. As rotation continues, each bar, after contacting brush 108, contacts either of brushes 106 or 110, depending upon the direction of rotation.

Thus, if the commutator is rotating counterclockwise, as when the generator frequency is below the line frequency, a commutator bar, after leaving brush 108, engages brush 106 to complete a discharge circuit for the condenser through a current limiting resistor 117 and the operating coil of a relay 118, thus energizing the relay and closing normally open contacts 120 thereby to energize the field winding 35 of the motor 34 causing it to rotate in the significant direction tending to regulate the governor 30 in the proper direction to speed up the prime mover 24 thereby to compensate for the existing slip frequency between the systems. If, on the other hand, the commutator 96 were rotating clockwise (generator too fast), a commutator bar leaving brush 108 would next contact brush 110 and close a discharge circuit for the condenser 114 through a current limiting resistor 123 and the operating coil of a relay 124 which, when energized, closes normally open contacts 126 to energize the governor motor field section 36, thereby to operate the governor motor in the proper direction to regulate the governor 30 for a reduction in prime mover speed. The proper field section of the governor motor is pulsed by the condenser discharges at a pulse rate which is proportional to the frequency difference between the generator 10 and line 12, the pulsing continuing until the electrical speeds of the two systems coincide.

The dwell time of the relays 118 and 124 may be increased over the time constant of the pulsing network by connecting across each relay coil an energy storage network to receive energy when the condenser 114 is discharging through the relay coil and then discharge its stored energy through the relay coil in the proper direction to hold the relay in for an interval after a commutator bar breaks contact with the discharge circuit of condenser 114, that is, after the original pulse applied to the relay coil by discharge of condenser 114. Such energy storage networks may be, for example, condenser-resistor networks as indicated at 128 and 130. The increase in pulse length or dwell time of these relays may be controlled by changing the time constant of the associated condenser-resistor networks 128 and 130. Relays 118 and 124 are preferably of the polarized type.

To avoid the possibility of a perfect frequency match with the two systems too far out of phase to produce an operating output in the later described phase detector, one of the field sections of the governor motor 34 is periodically pulsed to produce a bias in one direction which will make the generator output drift through the point of phase coincidence with the other system, so that the phase detector may function properly. This superposed periodic pulse may have a relatively slow period.

In a particular example of the illustrated embodiment the pulses were applied about three or four seconds apart to the field section 35 which tended to speed up the generator. The pulsing was provided by a delayed action relay such as is shown at 129 with an armature 131 and dashpots at both ends to delay the pull in and drop out of the relay. The operating coil 132 of this relay is energized through normally closed contacts 134 which open when the relay is energized thus de-energizing the relay and again closing the contacts to repeat the cycle which is repeated at a rate determined by the dashpot adjustments. Another set of contacts 136 operated by the oscillating relay armature 131 pulse the motor field section 35 with power from the battery 37 at the periodic rate of the relay armature 131. Contacts 138, also operated by the armature 131, open when contacts 136 are closed, thus preventing accidental pulsing of the motor field section 36 by the pulsing relay 129.

In addition to the matching of voltages and frequencies before paralleling two systems, it is necessary that the two systems be substantially in phase coincidence before their interconnection. In the present apparatus the phase detector 84 detects the phase relations between the two systems and causes the contactor 20 to be energized at the proper time to interconnect the systems. The phase detector includes a phase sensitive demodulator 140 having two A. C. input circuits 142 and 144 connected to the respective systems through readily saturable electromagnetic devices 146, 148, 150 and 152, which devices convert the electric waves from the respective systems to electric pulses that are compared in the demodulator, which provides a D. C. output when the pulses appearing at both input circuits are substantially in phase.

The electromagnetic devices 146 and 150 are transformers with magnetizable cores 154 and 156 respectively carrying primary windings 158 and 160, and center-tapped secondary windings 142 and 144, the latter windings constituting the A. C. input circuits of the demodulator.

The electromagnetic device 148 is a saturating reactor with a winding 162 on a magnetizable core 164. Electromagnetic device 152 is a variable saturating reactor such as a doubler type self-saturating magnetic amplifier including a reactor 165 with parallel-connected load windings 166 and 168 on a magnetizable core 170, the load windings having connected in series therewith oppositely related one-way valves 172 and 174. Bias may be applied to the core 170 by a bias winding 176 connected to an adjustable and reversible supply source such as the battery-resistor network 178, which is operable to supply adjustable amplitude direct current of either polarity to the bias winding. The instant of saturation, i. e., the firing angle of the core 170, is controlled as later described by a control winding 180 connected through an adjustable resistor 182 to the output of a tachometer generator 184 driven by the differential motor 88 through gears 186.

The particular demodulator illustrated is known as a ring type demodulator and includes four one-way valves similarly oriented in a ring circuit 182 having two sets of opposite conjugate terminals, one set being connected to the secondary winding 142 of the transformer 146, while the other set of conjugate terminals is connected to the secondary winding 144 of the transformer 150.

The primary winding 158 of transformer 146 is connected to one of the phases of line 12 through the saturating reactor 148 and an impedance 188, for example a resistor, while the primary winding 160 of the transformer 150 is connected to one of the phases of the generator 10 through the load windings of the controllable saturating reactor (magnetic amplifier) 165 and an impedance 190, for example a resistor. For convenience transformer 146, reactor 148 and resistor 188, may be collectively referred to as network 187, while the transformer 150, reactor 165 and resistor 190 may be referred to as network 189. Care should be taken that the primary windings of the transformers 146 and 150 are connected to the same phases of the respective systems. The demodulator 140 provides a D. C. output between the center taps of the transformer secondary windings 142 and 144, which output, at the proper time, energizes a winding 192 of a differential relay 194 through a set of contacts 196, a unidirectional valve 198 and an adjustable resistor 200. Normally open, the contacts 196 are closed in response to the operation of a delayed action relay 202 which may be timed to operate a short time after the contactor 82 is energized, for example about two or three seconds thereafter, or a total of about eight seconds after generator 10 builds up to a certain percentage of normal terminal voltage.

Magnetizable cores 154, 156, 164 and 170 are preferably constituted of material having high permeability or substantially rectangular magnetic hysteresis loop characteristics, or both, to provide abrupt saturation of the cores. The time at which saturation occurs in saturable electromagnetic devices is also referred to as the "instant of saturation" or the "firing angle," the latter term being most widely accepted and use by those skilled in the art. Reactor 148 is proportioned to saturate at a smaller firing angle than the transformer 146, that is at lower values of current than the current values required to saturate the transformer 146, and reactor 165 in the magnetic amplifier 152 likewise is proportioned to saturate at an earlier instant than the transformer 150. One of two series-connected saturable electromagnetic devices can be made to saturate before the other by providing its core with more turns per inch than the core of the other. For example, if the cores 154 and 164 have the same magnetic characteristics, and if the winding 162 has more turns per inch of core length than the winding 158, reactor 148 will saturate before transformer 146. Also, one of two series-connected saturable electromagnetic devices can be made to saturate before the other by proper choice of different core materials. Also different loadings of the devices may be used to cause one to saturate before the other.

From the above it will be seen that the A. C. inputs 142 and 144 of the demodulator 140 are connected respectively to the line 12 and the generator 10 through similar networks 187 and 189, each including in series a resistor and first and second saturable electromagnetic devices, the first operable to saturate ahead of the second. In such a network the second device, which saturates later, has thereacross a voltage pulse, starting when the first device saturates and ending when the second device saturates. The beginning, duration, and end of such pulses are determined by known factors and parameters which can be designed and adjusted as desired. Some of these factors and parameters are supply voltage characteristics, core characteristics, resistances and impedances in the circuit, load winding characteristics, etc. The series impedances 188 and 190 may represent either the lumped resistances of the respective series circuits or may be impedances added as desired for current limitation or as a factor in determining the voltage supplied across the saturable devices. The series impedances 188 and 190 are not indispensable to the operation of the networks, especially if the resistance without them is sufficient to limit the current to safe values when pulses are formed.

The general behavior of such a series network including a resistor, a saturating reactor and a saturable transformer which saturates after the reactor, such as connects both A. C. inputs of the demodulator to the line 12 and generator 10, is illustrated by the curve in Fig. 2, which is idealized for convenient illustration, and which is specifically tied to reference letters defining certain points in network 187 connecting the line 12 to the demodulator.

In this figure, which shows a full wave of the voltage from line 12, the duration of a major portion of the voltage across the reactor, transformer and resistor, in any half cycle, is indicated by the letters which embrace these elements in Fig. 1. For example, the voltage duration across the entire series circuit is indicated as between letters A and D, that across reactor 148 between letters A and B, that across the transformer primary 158 between B and C, and the voltage duration across resistor 188 between C and D. Reactor 148 fires (saturates) at X° while transformer 146 saturates at Y°. Therefore the width of the pulse appearing across the transformer is Y°−X°, the space or time between the two firing angles.

Except that its ultimate pulse is shiftable and the voltage applied thereacross comes from the generator 10, the network 189 operates in the same manner as network 187, and corresponding points in the circuits carry the same letters, with a prime mark added in the case of network 189. Thus, point A in network 187 corresponds to point A' in network 189, etc., and Fig. 2 is also applicable to network 189.

Similar pulses occur across the primary windings of both transformers 146 and 150, and by induction across their secondary windings 142 and 144, the A. C. inputs of the demodulator 140. When the pulses at both inputs 142 and 144 are in phase, direct current of one polarity will flow through a circuit connected between the output terminals of the demodulator. When the respective pulses at the inputs 142 and 144 are 180° out of phase, direct current of the opposite polarity will flow, if allowed, in a circuit connected between the demodulator output terminals, which terminals incidentally are the center taps of the transformer secondary windings 142 and 144. If the pulses at both transformers occur in the same part of the cycle and are of substantially the same duration, the direct current in the demodulator output circuit will flow when the applied waves from the respective systems, generator 10 and line 12, are in phase or 180° out of phase. Except for the fact that as a practical matter the pulses have to have some width, it is generally desirable to have little or no demodulator output current when the phase angle between the pulses is something between 0° and 180°, and between 180° and 360°. The sharpness and accuracy of the phase detector is increased as the width of the pulses is decreased. There should be sufficient pulse width to effect the operations of the relay 194 when desired in response to phase coincidence of the pulses. Fig. 3, which is self-explanatory, illustrates the demodulator output in response to different phase relations of the voltages supplied to the respective inputs of the demodulator.

Because it is desirable to operate the relay 194 only when the pulses fed to the demodulator inputs are in phase, the operating circuit of the relay winding 192 is polarized to prevent operation of the relay when the pulses are 180° out of phase. This may be accomplished by use of a polarized relay or by a one-way valve as indicated at 193 in the demodulator output circuit. When relay 194 is operated by coil 192, normally open contacts 201 are closed to energize the operating coil 203 of a slow-to-release relay 204.

When relay 204 is operated by coil 203, normally open contacts 205 are closed to complete the contactor operating circuit from the secondary 62 of transformer 58 to the contactor coil 22 through a rectifier 206. In addition to interconnecting the generator 10 and the line 12, operation of contactor 20 closes a contactor holding circuit through normally open contacts 208 and normally closed manually operable safety control switch 210, and opens normally closed contacts 83 to de-energize relay 82 and disconnect the speed matching and phase detection circuits from the line and generator after the systems have been paralleled.

In order to prevent the interconnection of the generator 10 with the line 12 when they are operating at too great a frequency difference, a hold-off signal from the tachometer generator 184 is applied through an adjustable resistor 211 to a lock-out coil 212 of the relay 194, which prevents operation of the relay 194 by its operating coil 192 as long as the hold-off signal is at or above the value that is indicative of the widest instantaneous frequency difference that could be tolerated when paralleling the systems. The tachometer generator 184 may be connected to the rotor 92 of the differential motor 88 through a gear system 186 which has a high enough ratio to allow the tachometer generator to generate significant voltages at the relatively slow speeds of the motor rotor at low slip frequencies or near synchronism of the two systems. In a particular system a gear ratio of above six (tachometer generator) to one (rotor 92) gave excellent results. Where the tachometer generator has a sufficiently high output at slow speeds, it may be directly coupled to the rotor 92 without intervening gears.

The output voltage of the tachometer generator is proportional to the instantaneous frequency difference between the generator 10 and the line 12. The polarity of the tachometer generator voltage reverses with reversal of rotation, rotation in one direction providing one polarity and rotation in the opposite direction providing the opposite polarity. Thus, although the same voltage value of either polarity indicates the same frequency difference between the two systems, the particular polarity will indicate whether the frequency of the generator 10 is above or below that of the line 12.

Resistors 200 and 211 are adjusted to provide proper current values in the lock-out coil 212 and the operating coil 192 to allow the operating coil 192 to overcome the lock-out coil 212 only when the instantaneous frequency difference between the two systems is below a predetermined lock-out frequency difference. In one actual example, the apparatus was adjusted to prevent relay operation when the frequency difference between the two systems was more than one-sixth of a cycle per second. A half-wave rectifier 213 and an adjustable resistor 214 may be used in conjunction with resistor 211 to obtain different lock-out limits when the frequency of generator 10 is above and below the line frequency.

Closure of contacts 205 applies power to the contactor operating coil 22. In the operation of such an apparatus, closure of the contactor 20 is not produced at the instant its control circuit is energized but occurs after a delay which is determined to a great extent by the operating characteristics of the contactor and intermediate relays. It is therefore necessary to energize the control circuit of the contactor 20 at a time preceding phase coincidence between the generator 10 and line 12 by an interval sufficiently long to cause closure of the contactor 20 at or near phase coincidence of the system voltages.

The rapidity with which the system voltages approach phase-coincidence is dependent on the difference between the system frequencies. In the present apparatus the relay coil 192 is energized at an advance phase angle (a point in advance of phase-coincidence) proportional to the instantaneous frequency difference, by employing the tachometer generator (184) output to shift the pulses supplied to the demodulator 140 through one of the A. C. inputs thereof.

Since the speed of rotation of the differential motor rotor 92 is proportional to the difference between the frequencies of the line 12 and generator 10, the output voltage from the tachometer generator 184 is also proportional to that frequency difference and to the rate-of-approach to phase-coincidence. Current from the tachometer generator is supplied through adjustable resistor 182 to the control winding 180 of the magnetic amplifier 152 to shift the position of the transformer (150) pulse by an amount proportional to the rate-of-approach to phase-coincidence.

Other factors in the magnetic amplifier having been fixed, the firing angle or instant of saturation of the core 170 may be advanced or retarded by changing the value of the current supplied to the control winding 180. Any shift in the firing angle of magnetic amplifier 152 necessarily produces a corresponding shift in the firing angle of the transformer 150. Thus, a shift in the firing angle of magnetic amplifier 152 effectively shifts the position of the transformer pulse within the cycle of the applied voltage as illustrated in Fig. 4.

In Fig. 4, the sine wave is the voltage wave across A'D' from generator 10. Ten degree pulses are shown, each delineated by solid and dotted vertical lines, the solid line indicating the firing angle (instant of saturation) of reactor 165 while the firing angle of the transformer 150 is indicated by the dotted line. In Fig. 4(a) the reactor 165 fires at 85°, and the transformer 150 at 95°, the transformer pulse extending from 85° to 95°.

Assuming that the latter conditions exist when no current flows in the control winding 180, then the pulse can be advanced by advancing the firing angle of the reactor with current supplied to the control winding in the direction which will aid the mmfs of self-saturation. This is illustrated in Fig. 4(b), where the reactor is shown saturating at 65°. Reversal of the control current opposes saturation and the firing angle is retarded thus retarding the pulse as shown in Fig. 4(c) where the firing angle of the reactor has been retarded to 105°.

As hereinbefore stated the control winding 180 is supplied with control current from the tachometer generator 184 to shift the transformer 150 pulse in accordance with the instantaneous frequency difference between line 12 and generator 10. The faster the approach to phase-coincidence the greater the shift in the demodulator pulse at input 144, the anticipation time remaining substantially constant. The demodulator pulse at transformer 150 may, as hereinbefore described, be either advanced or retarded, depending upon the polarity of the tachometer generator 184 output voltage, which in turn depends upon the direction of approach to phase-coincidence, i. e., whether the frequency of generator 10 is approaching the line frequency from the high side (above line frequency) or from the low side.

The action of the anticipation signal in shifting the pulse supplied to one of the inputs of the demodulator is illustrated in Fig. 5, wherein, as an example, closure of the contactor 20 is initiated one half second or thirty cycles before synchronism between two sixty cycle systems which are, at the time depicted, approaching phase-coincidence at about one-sixth of a cycle per second. In Fig. 5 the upper curve 220 is the voltage wave from the line 12, the line pulses supplied to the demodulator input 142 being shown as vertical lines 221 in about the middle (90°) of each half cycle. Below this curve are three curves, 222, 224, and 226, showing by their relation to curve 220 three positions of the voltage wave from generator 10 as it approaches phase-coincidence with the line from the low side (generator frequency is lower than line frequency). The pulses in transformer 150 derived from the generator voltage wave are advanced from the dotted position 228 to the solid vertical lines 230 by the anticipation signal from the tachometer generator 184, which for this condition aids the core saturation of reactor 165.

Position of curve 222 shows the relation of the systems' voltages about one second before phase coincidence. The respective waves are displaced about 60°, while the pulses 221 and 230 are about 30° apart. Curve 224 shows the generator voltage wave about 30° behind the line voltage wave, while the pulse 221 and 230 are now in phase and the output of the demodulator energizes relay winding 192 to close contacts 201 thus initiating the main switching operation. Curve 226 shows generator voltage one half second after position of curve 224, and at the instant of phase-coincidence with the line voltage. When the position of curve 226 is reached, the generator 10 and line 12 are interconnected by closure of contacts 14, 16 and 18.

If the approach to phase-coincidence by the generator 10 is from the high side (generator frequency higher than line), then the tachometer generator ouput voltage is reversed in polarity to retard the pulse at transformer 150 by supplying current to control winding 180 in the desaturating direction.

A brief summary of an operational example of the illustrated apparatus may be as follows:

When it is desired to parallel the generator 10 with line 12, the prime mover 24 is started up and its governor 30 will allow it to come up to and tend to maintain a speed which will drive the generator 10 at approximately the same electrical speed as the line 12. As the generator voltage reaches a predetermined percentage of the line voltage the delayed action contactor 82 is energized and after a delay, for example five seconds, the contacts of contactor 82 are closed connecting the speed matching apparatus 38 and the phase detector 84 to the line 12 and generator 10.

The delayed action relay 202 closes contacts 196 a short time later, for example two seconds after the contacts of contactor 82 have been closed. By this time the voltage regulator 42 has approximately matched the systems' voltages and the generator is near synchronous speed due to governor 30. The speed matching unit 38 in response to the differential motor 88 supervises and recalibrates the governor 30 to match the frequencies of the two systems. If the generator speed is low the field section 35 of motor 34 is pulsed by the commutator 96 to bring up the generator speed. If the generator speed is too high the commutator pulses the other field section 36 of the governor motor to reduce the prime mover speed.

In the meantime, pulses derived from the line and generator voltages are fed into the demodulator 140 and when the pulses as modified by the anticipation signal are in phase the demodulator output energizes relay winding 192 and closes contacts 201, provided that the frequency difference between the two systems is less than a predetermined lock-out frequency difference, for example one-sixth of a cycle per second. If the difference is higher than the lock-out frequency difference, then the signal from the tachometer generator 184 is strong enough in the lock-out winding 212 to prevent closure of the contacts 201.

Closure of contacts 201 operates delayed-release relay 204 to close contacts 205 thereby energizing contactor 22 and operating the contacts of the contactor 20 from their normal positions. The delayed-release characteristic of relay 204 makes certain that contacts 205 will be closed long enough to insure operation and lock-in of contactor 20. Upon operation of contactor 20, contacts 14, 16 and 18 are closed interconnecting the two systems. Contacts 83 are opened to break the operating circuit to contactor 82 thus disconnecting the synchronizing apparatus from the two systems. Contacts 66 open and contacts 76 close to substitute voltage references in the voltage regulator 42. Contacts 208 close to complete a holding circuit for contactor 20. The systems may be disconnected by manually opening contacts 210.

While the form of embodiment of the invention as herein disclosed constitutes a preferred form, it is to be understood that other forms might be adopted, all coming within the scope of the claims which follow.

What is claimed is as follows:

1. An apparatus for selectively pulsing either one of two electrical control elements, said apparatus comprising a condition responsive rotatable device operable to rotate in opposite directions in response to opposite conditions, energy storage means, an electrical source for supplying energy to said storage means, means responsive to rotation of said device for intermittently connecting the storage means to said source, first circuit means responsive to the rotation of said device in one direction for discharging said storage means, second circuit means responsive to the rotation of said device in the opposite direction for discharging said storage means, means responsive to the discharge of the storage means through the first circuit means for operating one of said control elements, and means responsive to the discharge of the storage means through the second circuit means for operating the other control element.

2. An apparatus for selectively pulsing either one of two electrical control elements, said apparatus comprising a condition responsive rotatable device operable to rotate in opposite directions in response to opposite conditions, a condenser, an electrical source for charging said condenser, means responsive to rotation of said device for intermittently connecting the condenser to said source, first circuit means responsive to the rotation of said device in one direction for discharging said condenser, second circuit means responsive to the rotation of said device in the opposite direction for discharging said condenser, means responsive to condenser discharge through the first circuit means for operating one of said control elements, and means responsive to condenser discharge through the second circuit means for operating the other control element.

3. An apparatus for selectively pulsing either one of two electrical control elements, said apparatus comprising a condition responsive rotatable device operable to rotate in opposite directions in response to opposite conditions, a condenser, an electrical source for charging said condenser, means responsive to rotation of said device for intermittently connecting the condenser to said source, first circuit means responsive to the rotation of said device in one direction for discharging said condenser, second circuit means responsive to the rotation of said device in the opposite direction for discharging said condenser, means responsive to condenser discharge through the first circuit means for operating one of said control elements, means responsive to condenser discharge through the second circuit means for operating the other control element, and means for providing a periodic overriding operating pulse to one of said control elements.

4. Apparatus for selectively pulsing either one of two electrically operable control elements, said apparatus comprising a rotatable contact which is rotatable in opposite directions along the circumference of a circle generated by the contact, first, second and third brush contacts circumferentially spaced along said circumference in the order named and engageable in that order by the rotating contact when the latter rotates in one direction and engageable in the opposite order when the rotating contact rotates in the opposite direction, a condenser, an electrical source for charging the condenser, circuit means including said second brush contact and said rotatable contact when mutually engaged for connecting the condenser to said source, circuit means including said first brush contact and the rotatable contact when mutually engaged for discharging the condenser through one of said control elements, and circuit means including said third brush contact and said rotatable contact when mutually engaged for discharging the condenser through the other of said control elements.

5. Apparatus for regulating the speed of a generator with respect to the frequency of an electrical circuit, said apparatus comprising a prime mover for driving said generator, a rotatable device, differential means energized by the generator and the electrical circuit for rotating said device in a direction and at a speed depending on the frequency difference between the generator and the electrical circuit, energy storage means, means for supplying energy to said energy storage means, first circuit means responsive to rotation of the device in one direction for discharging said storage means, second circuit means responsive to rotation of the device in the opposite direction for discharging said storage means, means responsive to said first circuit means for increasing the speed of the prime mover, and means responsive to said second circuit means for decreasing the speed of the prime mover.

6. Apparatus for regulating the speed of a generator with respect to the frequency of an electrical circuit, said apparatus comprising a prime mover for driving said generator, a rotatable device, differential means energized by the generator and the electrical circuit for rotating said device in a direction and at a speed depending on the frequency difference between the generator and the electrical circuit, a condenser, means for charging said condenser, first circuit means responsive to rotation of the device in one direction for discharging said condenser, second circuit means responsive to rotation of the device in the opposite direction for discharging said condenser, means responsive to said first circuit means for increasing the speed of the prime mover, and means responsive to said second circuit means for decreasing the speed of the prime mover.

7. Apparatus for regulating the speed of a generator with respect to the frequency of an electrical circuit, said apparatus comprising a prime mover for driving said generator, rotatable means, differential means energized by the generator and the electrical circuit for rotating said rotatable means in a direction and at a speed depending on the frequency difference between the generator and the electrical circuit, a condenser, means responsive to the rotation of said rotatable means for charging said condenser, first circuit means responsive to rotation of the rotatable means in one direction for discharging said condenser, second circuit means responsive to rotation of the rotatable means in the opposite direction for discharging said condenser, means responsive to said first circuit means for increasing the speed of the prime mover, and means responsive to said second circuit means for decreasing the speed of the prime mover.

8. Apparatus for regulating the speed of a generator with respect to the frequency of an electrical circuit, said apparatus comprising a prime mover for driving said generator, rotatable means, differential means energized by the generator and the electrical circuit for rotating said rotatable means in a direction and at a speed depending on the frequency difference between the generator and the electrical circuit, a condenser, means responsive to a first angular position of said rotatable means for charging said condenser, means responsive to a second angular position of the rotatable means for discharging said condenser, means responsive to a third angular position of the rotatable means for discharging said condenser, said first angular position being between said second and third angular positions, means responsive to the discharge of the condenser in response to said second angular position for increasing the speed of the prime mover and means responsive to the discharge of the condenser in response to said third angular position for decreasing the speed of the prime mover.

9. Apparatus for regulating the speed of a generator with respect to the frequency of an electrical circuit, said apparatus comprising a prime mover for driving said generator, a rotatable contact which is rotatable in opposite directions along the circumference of a circle generated by the contact, differential means energized by the generator and the electrical circuit for rotating said contact in a direction and at a speed depending on the frequency difference between the generator and the electrical circuit, first, second and third brushes circumferentially spaced along said circumference in the order named and engageable in that order by the rotating contact when the latter rotates in one direction and engageable in the opposite order when the rotating contact rotates in the opposite direction, a condenser, an electrical source for charging the condenser, means including said second brush and said rotatable contact when mutually engaged for connecting the condenser to said source, first circuit means responsive to engagement between said first brush and the rotatable contact for discharging the condenser, second circuit means responsive to engagement between said third brush and said rotatable contact for discharging the condenser, means responsive to the discharge of the condenser in response to engagement between the second brush and the rotatable contact for increasing the speed of the prime mover and means responsive to the discharge of the condenser in response to engagement between the third brush and the rotatable contact for decreasing the speed of the prime mover.

10. An apparatus for selectively pulsing an electrical control circuit in either one of two senses, said apparatus comprising a condition responsive rotatable device operable to rotate in opposite directions in response to opposite conditions, energy storage means, an electrical source for supplying energy to said storage means, means responsive to rotation of said device for intermittently connecting the storage means to said source, first circuit means responsive to the rotation of said device in one direction for discharging said storage means, second circuit means responsive to the rotation of said device in the opposite direction for discharging said storage means, means responsive to the discharge of the storage means through the first circuit means for energizing the control circuit in one sense, and means responsive to the discharge of the storage means through the second circuit means for energizing the control circuit in the opposite sense.

References Cited in the file of this patent

UNITED STATES PATENTS

| | | |
|---|---|---|
| 1,530,304 | Cox | Mar. 17, 1925 |
| 1,843,788 | Seeley | Feb. 2, 1932 |
| 1,892,540 | Seeley | Dec. 27, 1932 |
| 2,381,250 | Baumann | Aug. 7, 1945 |